United States Patent
Lakirovich et al.

(10) Patent No.: US 12,266,915 B2
(45) Date of Patent: Apr. 1, 2025

(54) SERIES Z-SOURCE CIRCUIT BREAKER WITH PULSE-TESTING CAPABILITY

(71) Applicant: S&C Electric Company, Chicago, IL (US)

(72) Inventors: Konstantin Lakirovich, Skokie, IL (US); John French, Chicago, IL (US); William Yadusky, Franklin, WI (US)

(73) Assignee: S&C Electric Company, Chicago, IL (US)

( * ) Notice: Subject to any disclaimer, the term of this patent is extended or adjusted under 35 U.S.C. 154(b) by 383 days.

(21) Appl. No.: 17/853,970

(22) Filed: Jun. 30, 2022

(65) Prior Publication Data

US 2023/0009635 A1 Jan. 12, 2023

Related U.S. Application Data

(60) Provisional application No. 63/220,290, filed on Jul. 9, 2021.

(51) Int. Cl.
*H02H 3/087* (2006.01)
*H02H 1/00* (2006.01)

(52) U.S. Cl.
CPC .......... *H02H 3/087* (2013.01); *H02H 1/0007* (2013.01)

(58) Field of Classification Search
CPC ...... H02H 3/087; H02H 1/0007; H02H 9/041; H01H 9/542; H01H 33/596

(Continued)

(56) References Cited

U.S. PATENT DOCUMENTS

| 4,686,393 A | 4/1987 | McEwan et al. |
| 2015/0222114 A1* | 8/2015 | Harper .................. H02H 9/045 |
| | | 361/91.5 |

(Continued)

FOREIGN PATENT DOCUMENTS

| CN | 108599117 A | * | 9/2018 | ............. H02H 7/268 |
| CN | 112993931 A | * | 6/2021 | ............. H02H 3/087 |
| WO | WO-2022211605 A1 | * | 10/2022 | ............. H01H 9/542 |

OTHER PUBLICATIONS

International Search Report and Written Opinion for International Application No. PCT/US2022/35861 dated Nov. 25, 2022. (10 pages).

(Continued)

*Primary Examiner* — Dharti H Patel

(57) ABSTRACT

A series Z-source circuit breaker including a semiconductor switch that breaks source power being provided to a load in response to overcurrent. An electromechanical switch is electrically coupled in parallel with the semiconductor switch, a first capacitor is electrically coupled to an output side of the semiconductor switch, a second capacitor is electrically coupled in parallel with the semiconductor switch, and a delay circuit is electrically coupled in series with the first capacitor. The semiconductor switch is in an open position and the electromechanical switch is in a closed position when overcurrent is not present. Upon detection of overcurrent the semiconductor switch is closed, the electromechanical switch is opened and the delay circuit is controlled to delay when reverse bias current is provided from the first capacitor to the semiconductor switch to prevent source power from being provided to the load to give the electromechanical switch time to open.

12 Claims, 2 Drawing Sheets

(58) Field of Classification Search
USPC .................................................. 361/42, 91.1
See application file for complete search history.

(56) References Cited

U.S. PATENT DOCUMENTS

| | | | |
|---|---|---|---|
| 2019/0190251 A1* | 6/2019 | Corzine | H03K 17/687 |
| 2020/0135420 A1 | 4/2020 | Steurer et al. | |
| 2023/0009635 A1* | 1/2023 | Lakirovich | H02H 1/0007 |

OTHER PUBLICATIONS

Sagar Bhatta; "Specification Control and Applications of Z-Source Circuit Breakers for the Protection of DC Power Networks"; Old Dominion University, Web, May 2021 (143 pages) https://digitalcommons.odu.edu/cgi/viewcontent.cgi?article=1222&context=ece_etds.
Fang Z. Peng; "Z-Source Inverter"; 2002 IEEE; p. 775-p. 781 (7 pages).
Arthur H. Chang et al.; "Design of DC System Protection"; 2013 IEEE; p. 500-p. 508 (9 pages).

* cited by examiner

SERIES Z-SOURCE CIRCUIT BREAKER WITH PULSE-TESTING CAPABILITY

CROSS-REFERENCE TO RELATED APPLICATION

This application claims the benefit of priority from the U.S. Provisional Application No. 63/220,290, filed on Jul. 9, 2021, the disclosure of which is hereby expressly incorporated herein by reference for all purposes.

BACKGROUND

Field

This disclosure relates generally to a series Z-source circuit breaker and, more particularly, to a series Z-source circuit breaker for a DC circuit.

Discussion of the Related Art

Circuit breakers are often employed in medium and high voltage DC circuits, such as vehicle charging stations, that open switch contacts, for example, vacuum interrupter contacts, in response to high current, such as fault current. Since there is no zero crossing of the current in DC circuits available to extinguish the current when the contacts separate to open the circuit breaker, DC circuit breakers require some added mechanism for extinguishing the fault current in addition to opening the switch contacts. Further, because the fault current rises very quickly in a DC circuit this presents significant circuit breaker design issues. Resonant AC/DC hybrid circuits have been employed in the art for use in DC circuit breakers that create an oscillating current having a zero crossing for extinguishing the fault current. These hybrid circuits add complexity and cost to the circuit breaker. It has been proposed in the art to employ series Z-source circuit breakers in DC circuits that employ semiconductor switches. However, as will be discussed below, series Z-source circuit breakers have a number of drawbacks.

SUMMARY

The following discussion discloses and describes a series Z-source circuit breaker for a DC circuit. The circuit breaker includes a positive bus and a negative bus operable for providing source power to a load. A breaker semiconductor switch is provided in the positive bus and is operable to break source power being provided to the load in response to overcurrent. An electromechanical switch is electrically coupled to the positive bus in parallel with the breaker semiconductor switch. A first capacitor is electrically coupled between the positive and negative buses at an output side of the breaker semiconductor switch, and a second capacitor is electrically coupled to the positive bus in parallel with the breaker semiconductor switch. A delay circuit is electrically coupled in series with the first capacitor between the positive and negative buses. The breaker semiconductor switch is in an open position and the electromechanical switch is in a closed position when overcurrent is not present to allow source power to flow to the load through the electromechanical switch. Upon detection of overcurrent the breaker semiconductor switch is closed, the electromechanical switch is opened and the delay circuit is controlled to delay when reverse bias current is provided from the first capacitor to the breaker semiconductor switch to prevent source power from being provided to the load to give the electromechanical switch time to open.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a series Z-source circuit breaker for a DC circuit is merely exemplary in nature, and is in no way intended to limit the disclosure or its applications or uses.

Figure 1:
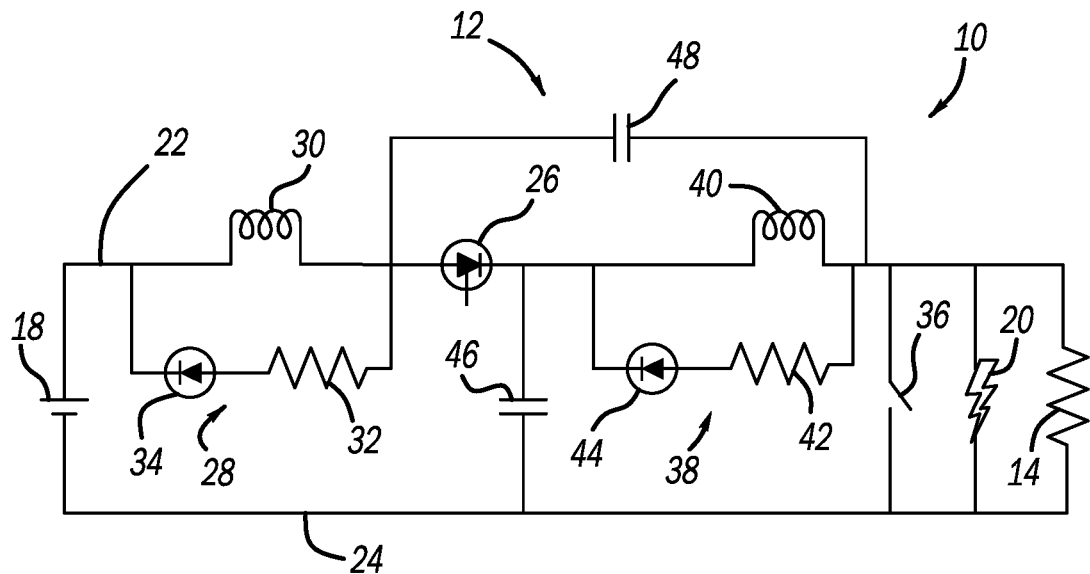
FIG. 1 is a schematic diagram of a known series Z-source circuit breaker.

FIG. 1 is a schematic diagram of a DC circuit 10 including a known series Z-source circuit breaker 12 that protects a load 14 from overcurrent from a DC power source 18, such as a battery, in response to, for example, a fault 20, which is fast rising, across a positive bus 22 and a negative bus 24. The circuit breaker 12 includes a semiconductor switch 26, specifically a silicon controlled rectifier (SCR), an LR circuit 28 on the bus 22 at an input or anode side of the SCR 26 and including an inductor 30, a resistor 32 and a diode 34, and an LR circuit 38 on the bus 22 at an output or cathode side of the SCR 26 and including an inductor 40, a resistor 42 and a diode 44. A reverse bias capacitor 46 is electrically coupled across the buses 22 and 24 at the output side of the SCR 26 and a floating capacitor 48 is electrically coupled to the bus 22 in parallel with the SCR 26 and the LR circuit 48. A manual switch 36 may be provided across the buses 22 and 24 to generate an artificial fault. Further, it is known to replace the SCR 26 with a switch based on a Thomson coil.

During normal operation of the circuit breaker 12, the SCR 26 is gated on and is conductive, and thus source power from the power source 18 is provided to the load 14. The capacitor 46 is charged to the source potential from the buses 22 and 24, the capacitor 48 is discharged to zero potential because of the current path through the SCR 26 and the inductor 40, and the impedance provided by the inductors 30 and 40 controls the voltage on the bus 22 to control the current flow. When the fault 20 occurs the inductors 30 and 40 limit the fault current rise, and the voltage polarity across the SCR 26 is almost instantaneously reversed, where its cathode potential becomes greater than its anode potential. Reverse-recovery current to the SCR 26 is sourced from the capacitor 46 into the cathode side of the SCR 26, and the capacitor 48 is charged allowing current flow around the SCR 26. This turns off the SCR 26 and prevents further current flow into the fault 20, which isolates the fault 20 from the source 18.

The series Z-source circuit breaker 12 has a number of drawbacks. Specifically, by using the SCR 26 having a semiconductor in the main current conduction path means resistive power losses, which requires a cooling system to handle the heat dissipation. This increases the size and cost of the circuit breaker 12 that may not be acceptable for certain medium voltage applications. Also, by using the SCR 26 there is no actual physical break in the conduction path from the source 18 to the load 14 when the SCR 26 is reversed bias and stops conducting. Therefore, some current flow could still occur. Further, a serious flaw of the circuit breaker 12 is its inability to interrupt a fault immediately upon gating the SCR 26 on. More specifically, if the fault 20 is present when the SCR 26 is gated on, the capacitor 46 has not yet been charged to the source potential and the capacitor 48 is not discharged, and therefore it cannot source the reverse-recovery current nor the reverse bias required to turn off the SCR 26. Also, if the fault 20 creates a slow rising fault current, then the capacitor 46 is slowly discharged through the fault 20 through the inductor 40, where the inductor 40 doesn't exhibit a high impedance during the slow current rise, and the capacitor 48 slowly charges through the inductor 30, where the inductor 30 doesn't exhibit a high impedance during the slow current rise, and the thus the SCR 26 is not turned off.

Figure 2:
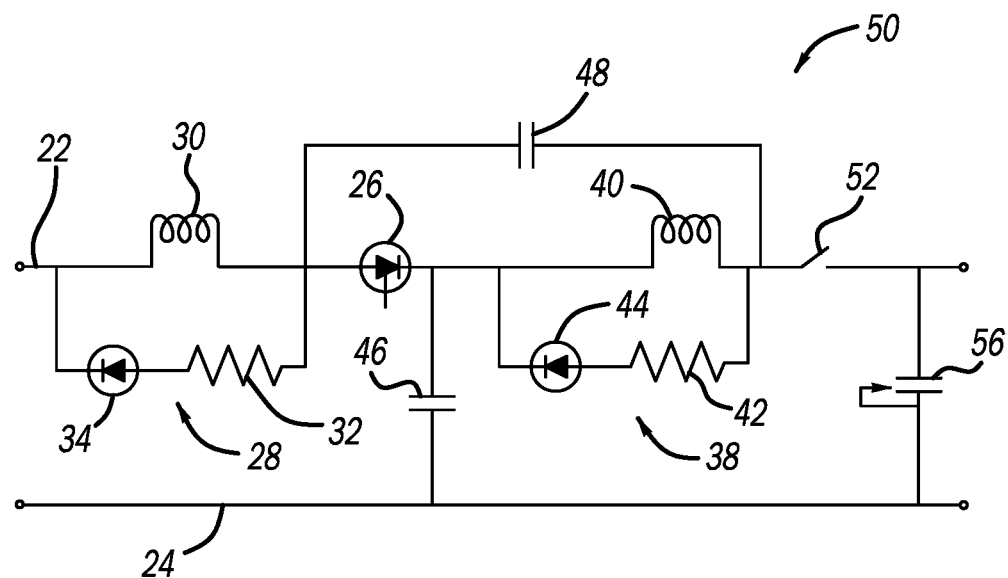
FIG. 2 is a schematic diagram of a series Z-source circuit breaker including an isolation switch.

This disclosure proposes a number of design changes to the traditional series Z-source circuit breaker 12 that overcome some or all of the drawbacks discussed above. FIG. 2 is a schematic diagram of a series Z-source circuit breaker 50 similar to the series Z-source circuit breaker 12, where like elements are identified by the same reference number. In order to overcome the problem discussed above where the fault 20 exists when the source 18 is powered on, the circuit breaker 50 includes an isolation switch 52, for example, an electromechanical switch, in the bus 22 downstream of the LR circuit 38. The switch 52 is initially open and when power is provided to the circuit breaker 50 from the source 18, the capacitor 46 has an opportunity to charge before the circuit breaker 50 sees the fault current. Once the capacitor 46 has an opportunity to charge while the capacitor 48 is discharged, the switch 52 is closed into the fault 20, the capacitor 46 will discharge into the SCR 26 through a fully discharged capacitor 48, thus turning it off and isolating the fault 20.

In one embodiment, the isolation switch 52 is a triggered vacuum gap (TVG) device. A TVG device generally includes two stationary main electrodes positioned within a vacuum chamber, where a main vacuum gap is defined between the electrodes. A TVG device also includes a triggering element, such as a triggering electrode, where a triggering vacuum gap is provided between the triggering electrode and the corresponding main electrode. A triggering gap is designed to have a much smaller gap length than the main vacuum gap so that its breakdown voltage is much lower than the breakdown voltage of the main gap. The triggering gap can be bridged by a ceramic insulator in order to make its breakdown voltage even lower. When a sufficiently high triggering voltage impulse is applied to the main electrode and the triggering electrode across the triggering gap, the triggering gap breaks down and a plasma cloud is created that propagates in a fraction of microsecond into the main gap and causes breakdown of the main gap, where this state of the TVG device represents a closed switch. Once the current flow in the TVG device begins it does not stop until the AC current signal on the electrodes cycles through a zero crossing point. When this occurs, the plasma is extinguished by the vacuum and the arc dissipates. Because the plasma can be ignited in the vacuum chamber in this manner, the timing of when the device conducts can be tightly controlled, i.e., on the order of micro-seconds. Further, because the electrodes don't move, there is not a requirement for an accurate mechanical actuation.

In normal operation, if the fault 20 is present when the switch 52 is closed, the SCR 26 will autonomously interrupt the fault 20 upon the discharge of the capacitor 46 in the reverse direction through the SCR 26. Once this current has been interrupted, the switch 52 can be opened. The switch 52 in this embodiment allows for fault-testing because the SCR 26 can be gated on while the switch 52 is open, and once the capacitor 46 is charged, the switch 52 can be pulsed and the fault let-through current is defined by the time to charge the capacitor 48. Once the capacitor 48 becomes charged, the arc across the switch 52 is extinguished.

In order to operate the SCR 26 when a slow-rising fault is occurring, a TGV device 56 can be coupled across the buses 22 and 24. When an electronic controller (not shown) detects a slow-rising, or low-current threshold fault, it commands the TGV device 56 to initiate an arc-fault to ground. This self-induced fault will create both an adequate fault ramp rate and fault current for the SCR 26 to isolate the fault. Once the fault is isolated, the arc established in the triggered gap is extinguished.

Figure 3:
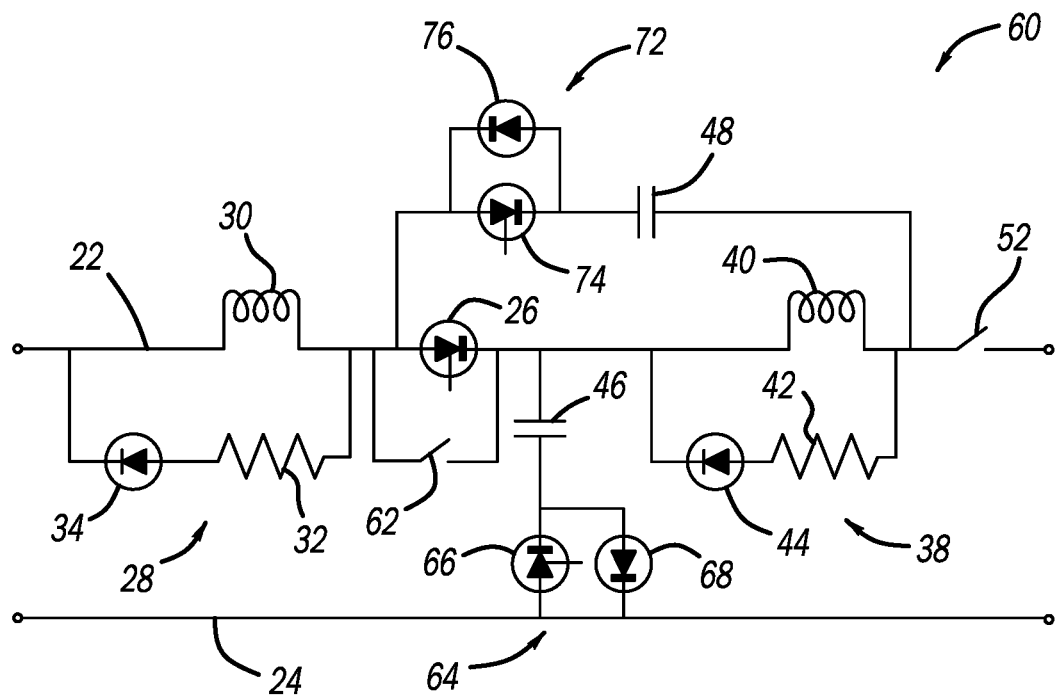
FIG. 3 is a schematic diagram of a series Z-source circuit breaker including an SCR and a delay circuit.

FIG. 3 is a schematic diagram of a series Z-source circuit breaker 60 similar to the series Z-source circuit breakers 10 and 50, where like elements are identified by the same reference number. The circuit breaker 60 includes an electromechanical switch 62 coupled in parallel with the SCR 26, where the switch 62 operates as the main current conduction path to the load 14. The circuit breaker 60 also includes a delay circuit 64 having an SCR 66 coupled in series with the capacitor 46 between the buses 20 and 22 and a diode 68 coupled in parallel with the SCR 66. When the SCR 66 is open, i.e., gated off, the diode 68 allows the capacitor 46 to charge, but the open SCR 66 prevents the capacitor 46 from discharging.

During normal operation, the switches 52 and 62 are closed and the SCR 26 is gated off. If the fault 20 is detected by a current sensor and controller (not shown), the controller will simultaneously gate the SCR 26 on and command the switch 62 to open. As the switch 62 opens, an arc will form across its contacts, which will have an impedance characteristic, and since the SCR 26 is gated on, allows the current to commutate through the SCR 26 rather than through the switch 62, and therefore the switch 62 opens under zero-current and near-zero voltage conditions. After a short time delay to allow the switch 62 to open, the controller gates the SCR 66 on, which allows the capacitor 46 to conduct and current to flow out of the capacitor 46 in the reverse direction through the SCR 26 and through the capacitor 48, thereby reverse biasing the SCR 26 and turning it off. By then, the switch 62 has finished opening and any residual plasma will have dissipated, so no arc is re-established across its contacts.

It may also be desirable to delay when the capacitor 48 conducts when the fault 20 is detected and the SCR 26 is reverse-biased because the switch 62 operates much slower, on the order of milliseconds, than the SCR 26, which operates on the order of microseconds. In order to provide this delay, a delay circuit 72 having an SCR 74 can be coupled in series with the capacitor 48 and a diode 76 coupled in parallel with the SCR 74. When the SCR 74 is open, i.e., gated off, the diode 76 allows the capacitor 48 to discharge, but the open SCR 74 prevents the capacitor 48 from charging. By slowing down when the reverse bias of the SCR 26 can conduct through the capacitor 48 allows the switch 62 time to open.

Figure 4:
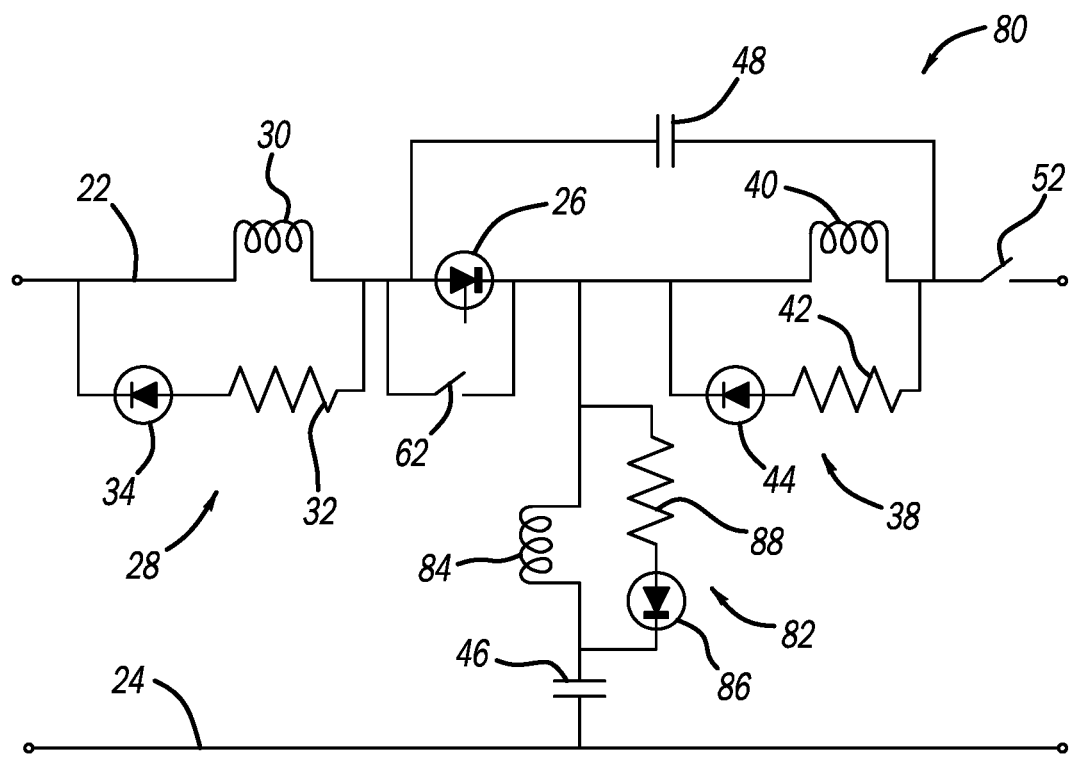
FIG. 4 is a schematic diagram of a series Z-source circuit breaker including an SCR and another type of delay circuit.

The circuit breaker 60 required a controller to turn on the SCR 66 to provide the delay. It may be desirable to provide that delay using a passive delay circuit. FIG. 4 is a schematic diagram of a series Z-source circuit breaker 80 similar to the series Z-source circuit breakers 10, 50 and 60, where like elements are identified by the same reference number. The circuit breaker 80 includes a delay circuit 82 having an inductor 84 coupled in series with the capacitor 46 between the buses 22 and 24, where a diode 86 and a resistor 88 are coupled in series across the inductor 84. The delay circuit 82 adds a delay to the discharging of the capacitor 46 to allow the switch 62 to open while the SCR 26 is conducting into the fault 18. The dynamic impedance of the inductor 84 provides enough time before the capacitor 46 discharges enough current through the SCR 26 reversing the bias voltage and turning it off.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A series Z-source circuit breaker comprising:
    a positive bus and a negative bus operable for providing source power to a load;
    a breaker semiconductor switch provided in the positive bus and being operable to break the source power being provided to the load in response to overcurrent;
    an electromechanical switch electrically coupled to the positive bus in parallel with the breaker semiconductor switch;
    a first capacitor electrically coupled between the positive and negative buses at an output side of the breaker semiconductor switch;
    a second capacitor electrically coupled to the positive bus in parallel with the breaker semiconductor switch; and
    a first delay circuit electrically coupled in series with the first capacitor between the positive and negative buses, wherein the breaker semiconductor switch is in an open position and the electromechanical switch is in a closed position when overcurrent is not present to allow source power to flow to the load through the electromechanical switch, and wherein upon detection of the overcurrent the breaker semiconductor switch is closed, the electromechanical switch is opened and the first delay circuit is controlled to delay when reverse bias current is provided from the first capacitor to the breaker semiconductor switch to prevent source power from being provided to the load to give the electromechanical switch time to open.

2. The circuit breaker according to claim 1 wherein first delay circuit includes a delay semiconductor switch electrically coupled in series with the first capacitor and a diode electrically coupled in parallel with the delay semiconductor switch, and wherein the diode allows the first capacitor to be charged and the delay semiconductor switch prevents the first capacitor from discharging when it is open.

3. The circuit breaker according to claim 2 wherein the breaker semiconductor switch and the delay semiconductor switch are silicon controller rectifiers.

4. The circuit breaker according to claim 1 wherein the first delay circuit includes an inductor electrically coupled in series with the first capacitor and a diode electrically coupled in parallel with the delay semiconductor switch, and wherein the diode allows the first capacitor to be charged and the inductor prevents the first capacitor from discharging.

5. The circuit breaker according to claim 1 further comprising a second delay circuit electrically coupled in series with the second capacitor, wherein the second delay circuit is controlled to delay when zero bias current is sent from the second capacitor to the breaker semiconductor switch to prevent source power from being sent to the load to give the electromechanical switch time to open.

6. The circuit breaker according to claim 5 wherein the second delay circuit includes a delay semiconductor switch electrically coupled in series with the second capacitor and a diode electrically coupled in parallel with the delay semiconductor switch, and wherein the diode allows the second capacitor to be discharged and the delay semiconductor switch prevents the second capacitor from charging.

7. The circuit breaker according to claim 6 wherein the breaker semiconductor switch and the delay semiconductor switch are silicon controller rectifiers.

8. The circuit breaker according to claim 1 further comprising an isolation switch in the positive bus downstream of the breaker semiconductor switch, the isolation switch being opened to provide isolation between the breaker semiconductor switch and the load when the breaker semiconductor switch is first energized.

9. The circuit breaker according to claim 8 wherein the isolation switch is an electromechanical switch.

10. The circuit breaker according to claim 8 wherein the isolation switch is a triggered vacuum gap (TVG) device.

11. The circuit breaker according to claim 1 further comprising a triggered vacuum gap (TVG) device coupled between the positive and negative buses downstream from the breaker semiconductor switch.

12. The circuit breaker according to claim 1 wherein the circuit breaker is employed in a DC circuit.

* * * * *